(12) United States Patent
Imojo et al.

(10) Patent No.: US 8,054,407 B2
(45) Date of Patent: Nov. 8, 2011

(54) LIQUID CRYSTAL DISPLAY DEVICE

(75) Inventors: Yoshihiro Imojo, Mobara (JP); Yoshifumi Sekiguchi, Hitachiota (JP)

(73) Assignees: Panasonic Liquid Crystal Display Co., Ltd., Hyogo (JP); Hitachi Displays, Ltd., Chiba-ken (JP)

( * ) Notice: Subject to any disclaimer, the term of this patent is extended or adjusted under 35 U.S.C. 154(b) by 866 days.

(21) Appl. No.: 12/068,090

(22) Filed: Feb. 1, 2008

(65) Prior Publication Data
US 2008/0186431 A1 Aug. 7, 2008

(30) Foreign Application Priority Data
Feb. 1, 2007 (JP) .................................. 2007-023066

(51) Int. Cl.
*G02F 1/1335* (2006.01)
(52) U.S. Cl. .............................. 349/67; 349/65; 362/613
(58) Field of Classification Search .............. 349/65–67; 362/613
See application file for complete search history.

(56) References Cited

U.S. PATENT DOCUMENTS

| | | | | |
|---|---|---|---|---|
| 5,897,183 A * | 4/1999 | Dehmlow | ........................ | 349/58 |
| 2002/0015297 A1* | 2/2002 | Hayashi et al. | ................. | 362/27 |
| 2007/0047228 A1* | 3/2007 | Thompson et al. | ........... | 362/237 |
| 2007/0047261 A1* | 3/2007 | Thompson et al. | ........... | 362/623 |
| 2007/0217040 A1* | 9/2007 | Suzuki et al. | ................. | 359/846 |
| 2008/0211989 A1* | 9/2008 | Park | .............................. | 349/64 |
| 2009/0231514 A1* | 9/2009 | Ohmi et al. | ..................... | 349/67 |

FOREIGN PATENT DOCUMENTS

| | | |
|---|---|---|
| JP | 08-082797 | 3/1996 |
| JP | 2003-31003 | 7/2001 |
| JP | 2006-260924 | 3/2005 |

* cited by examiner

*Primary Examiner* — Huyen Ngo
(74) *Attorney, Agent, or Firm* — Stites & Harbison PLLC; Juan Carlos A. Marquez, Esq.

(57) ABSTRACT

The present invention provides a light-weighted backlight capable of ensuring a sufficient light quantity at a low cost. A backlight is arranged below a liquid crystal panel. A light source is arranged in the vertical direction with respect to a screen of the liquid crystal panel so that light from the light source is directed toward the liquid crystal panel by a reflector. Due to such a constitution, the reflector can also function as a back lid of the backlight. Further, the reflector plays a role of directing the light from the light source toward the liquid crystal panel and hence, a light guide plate can be omitted. Due to such a constitution, the present invention can realize the reduction of weight and cost of the backlight or the liquid crystal display panel.

8 Claims, 12 Drawing Sheets

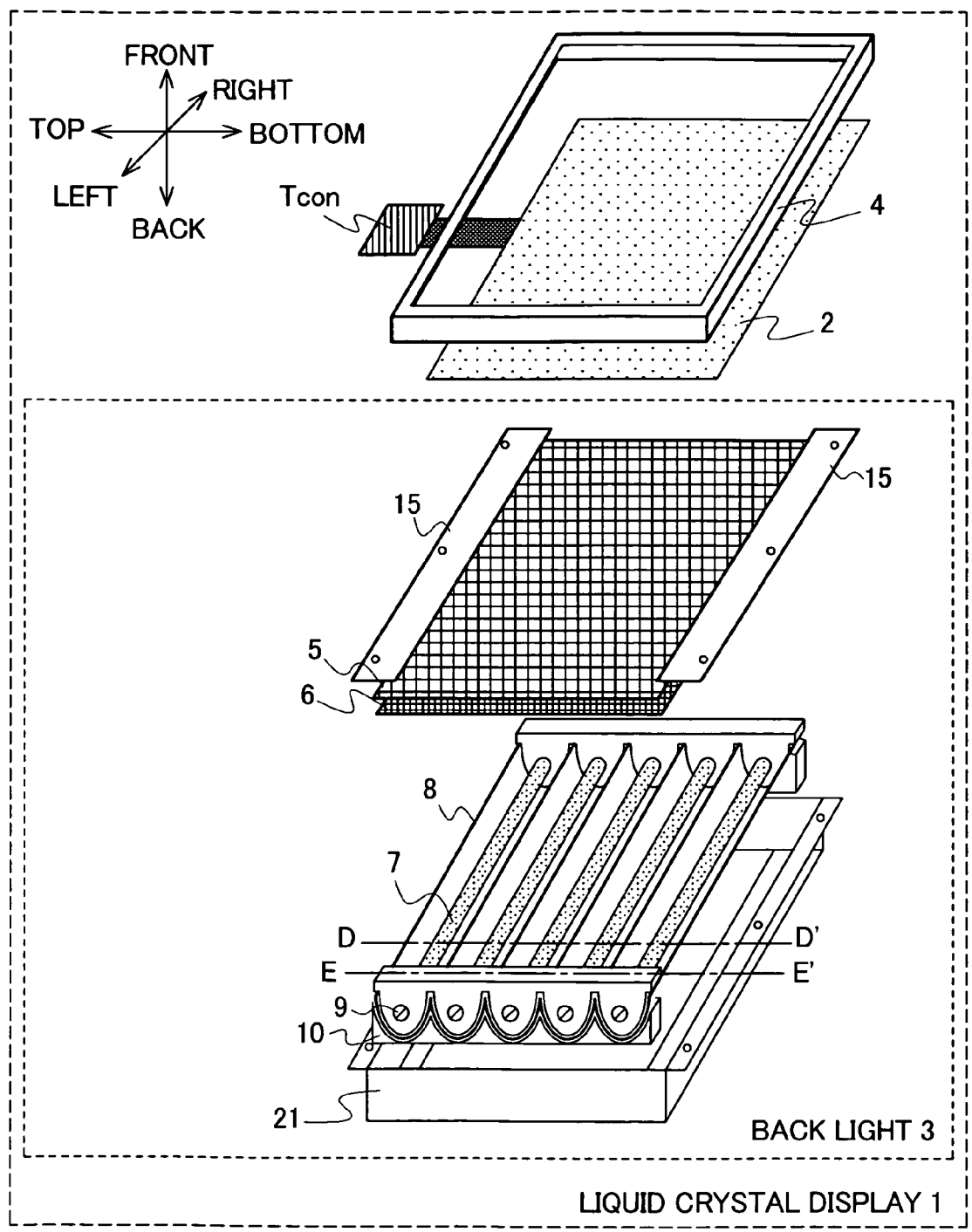

FIG. 10
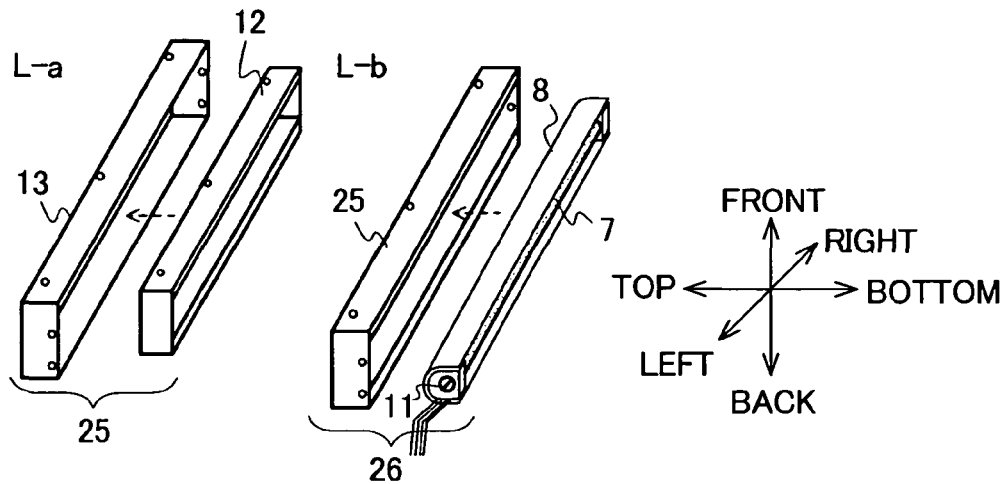
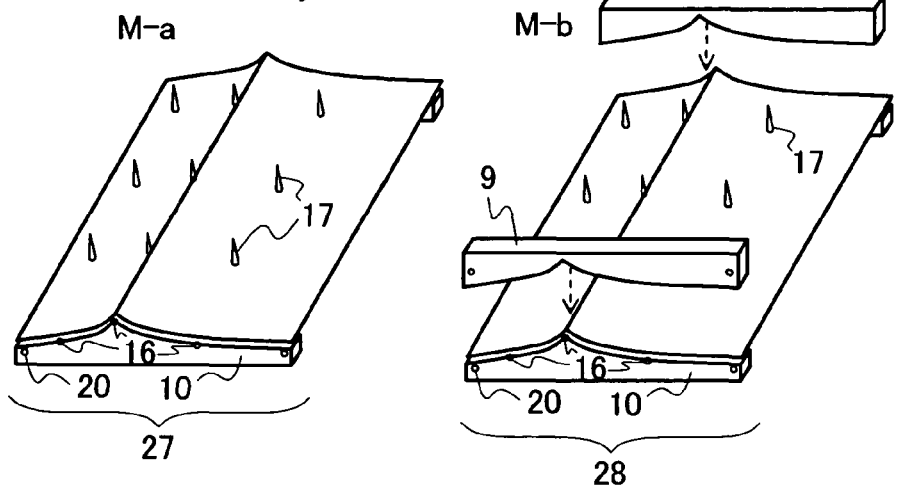
Main chassiss assembly
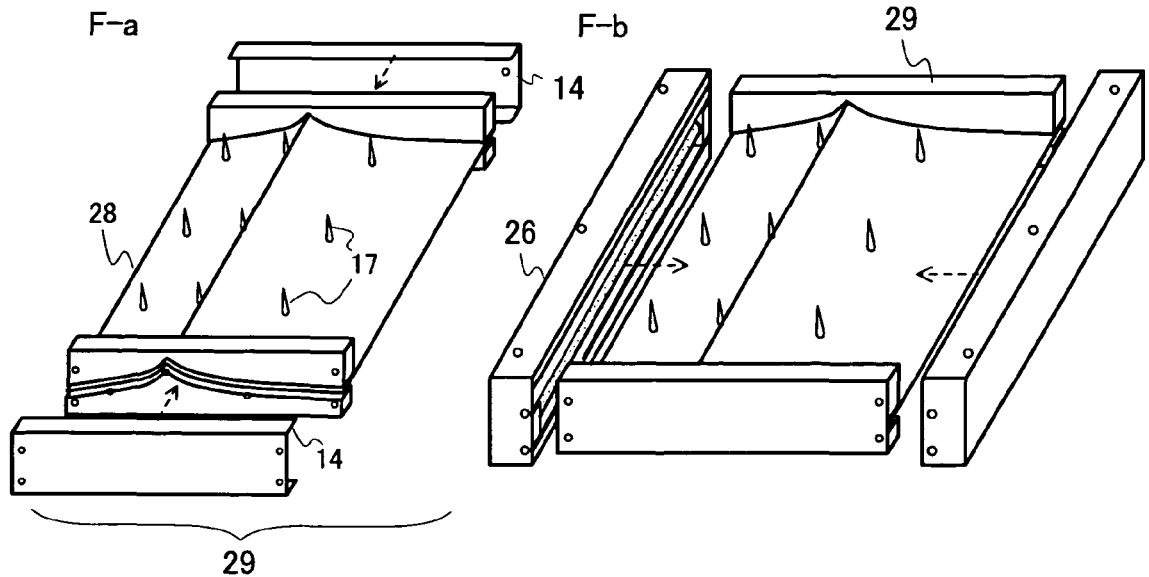
Final assembly

LIQUID CRYSTAL DISPLAY DEVICE

The present application claims priority from Japanese application JP2007-023066 filed on Feb. 1, 2007, the content of which is hereby incorporated by reference into this application.

BACKGROUND OF THE INVENTION

The present invention relates to an illumination device, and more particularly to a backlight used in a liquid crystal display device.

A TFT (Thin Film Transistor) type liquid crystal display device has been popularly used as a display device of a liquid crystal television receiver set, a personal computer or the like. The liquid crystal display device is constituted of a liquid crystal panel having a drain driver and a gate driver arranged on a periphery thereof and a back light radiating light to the liquid crystal panel.

The backlight is classified into an edge-light-type backlight and a direct-type backlight. One of crucial tasks that both backlights possess is the acquisition of a uniform backlight by suppressing brightness irregularities.

As one of means for suppressing brightness irregularities, there has been proposed a technique which can reduce the brightness irregularities by forming a reflector mounted on a bottom surface of the backlight in an optically suitable shape different from a simple planar shape. Patent document 1 (JP-A-2003-31003) and Patent document 2 (JP-A-2006-260924) disclose such a technique.

An illumination device used in the backlight of the liquid crystal display device includes a reflector on a side thereof opposite to a light radiating surface (a bottom surface of the backlight). To enhance the uniformity of the light radiating surface of the backlight, it is preferable to form, not a usual planar shape but a surface having a bent shape such as a wave shape. As a simple method for forming the shape of the reflector into such a shape, it may be possible to mount a mold made of iron or resin and having such a shape on a bottom surface of the backlight and, then, to adhere a reflection sheet reflecting light to the mold. However, due to the adhesion of an extra material to the reflection sheet, there arises a drawback that the backlight becomes heavy.

It is an object of the present invention to provide, in a liquid crystal display device which includes a backlight, the simple structure of a backlight having a reflector of an arbitrary shape.

The above-mentioned and other objects and novel features of the present invention will become apparent from the description of this specification and attached drawings.

The present invention has been made to overcome the above-mentioned drawbacks. To briefly explain the summary of typical inventions among the inventions described in this specification, they are as follows.

(1) According to a first aspect of the present invention, there is provided a liquid crystal display device which includes: a liquid crystal panel; and a backlight arranged on a side opposite to a display screen of the liquid crystal panel, wherein the backlight includes a light source and a reflector for reflecting light radiated from the light source toward the liquid crystal panel, and the reflector has a shape thereof determined due to the fixing of the end portions of the reflector to the backlight.

(2) According to a second aspect of the present invention, there is provided a liquid crystal display device which includes: a liquid crystal panel; and a backlight arranged on a side opposite to a display screen of the liquid crystal panel, wherein the backlight includes a light source and a reflector for reflecting light radiated from the light source toward the liquid crystal panel, and the reflector forms a bottom surface of the backlight.

(3) According to a third aspect of the present invention, there is provided a liquid crystal display device which includes: a liquid crystal panel; and a backlight arranged on a side opposite to a display screen of the liquid crystal panel, wherein the backlight includes a light source and a reflector for reflecting light radiated from the light source toward the liquid crystal panel, the reflector has a shape thereof determined due to the fixing of the end portions of the reflector to the backlight, and the reflector forms a bottom surface of the backlight.

The present invention provides an illumination device having a simplified structure which can simply form a shape of a reflector and, at the same time, can acquire both the uniformity of brightness of the illumination device and the reduction of thickness of the illumination device.

To be more specific, according to the present invention, a back lid of a lower frame which houses a backlight device therein can be eliminated and hence, a weight of the backlight can be largely reduced. Particularly, the lower frame is often made of a metal and hence, the elimination of the back lid brings about a large weight reduction effect. Further, the elimination of the back lid also brings about the reduction of a part cost and an assembly cost.

Further, according to the present invention, even when an edge-light-type backlight is used, light from a light source can be directed toward a liquid crystal panel without using a so-called light guide plate thus realizing the reduction of weight and the reduction of cost of the backlight.

BRIEF DESCRIPTION OF THE DRAWINGS

FIG. 7 is an exploded perspective view of a liquid crystal display device according to an embodiment 2.

FIG. 10 is a view for explaining the manner of assembling a liquid crystal display device according to an embodiment 4;

DESCRIPTION OF THE PREFERRED EMBODIMENT

Hereinafter, embodiments of a liquid crystal display device according to the present invention are explained in detail in

Embodiment 1

Figure 1:
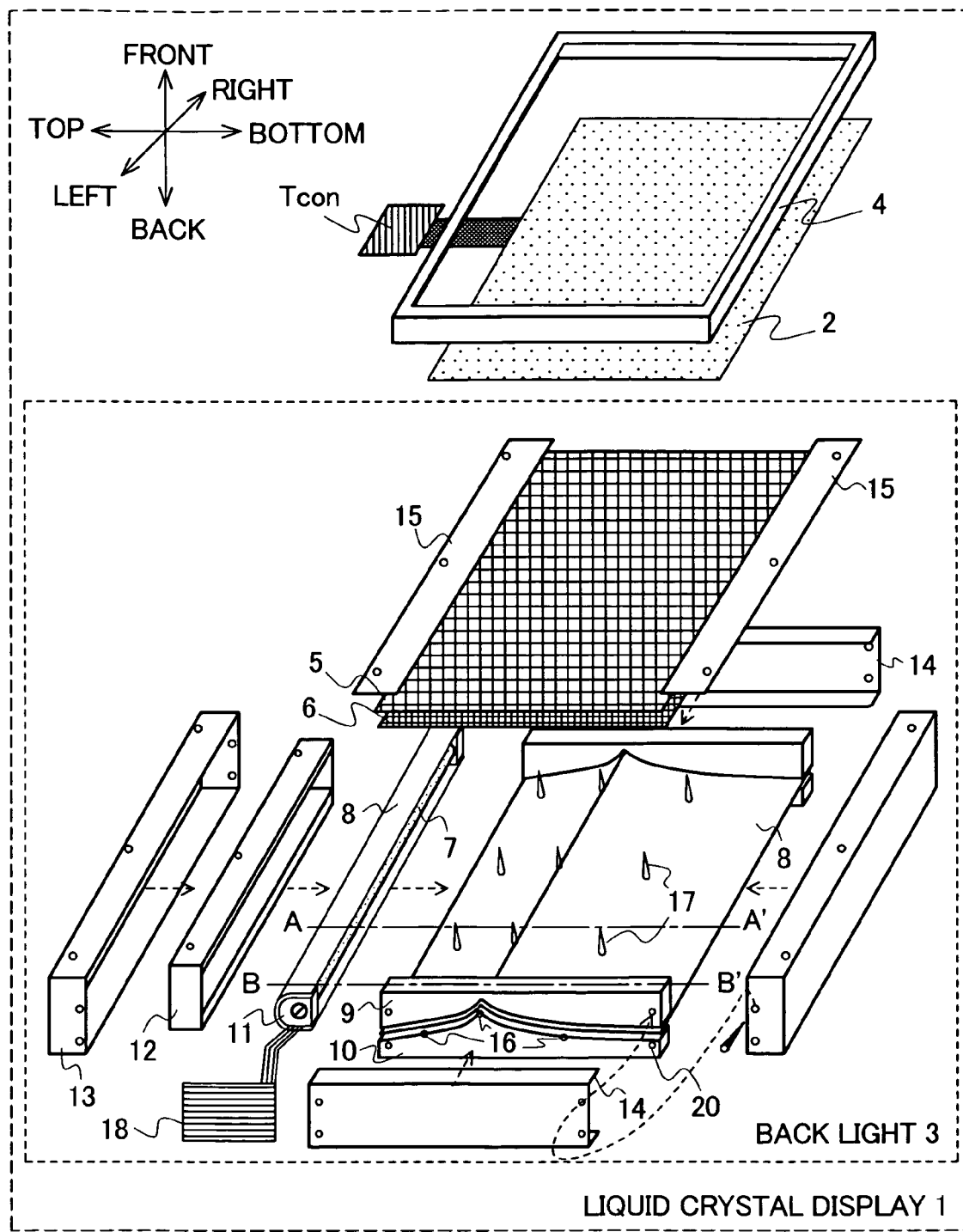
FIG. 1 is an exploded perspective view of a liquid crystal display device according to an embodiment 1 of the present invention.
Figure 2A:
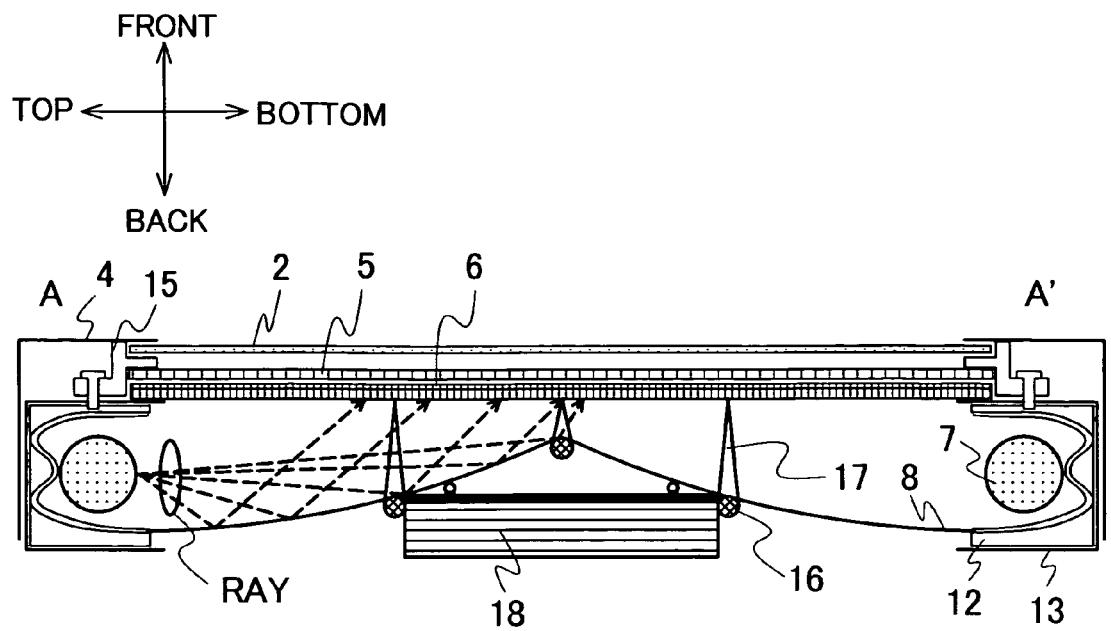
FIG. 2A and FIG. 2B are cross-sectional views taken along a line A-A' and a line B-B' in FIG. 1.
Figure 2B:
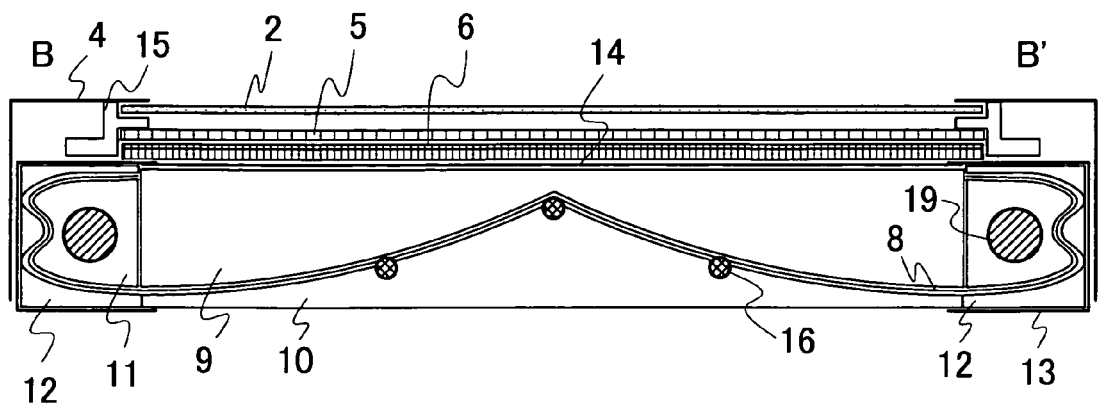

FIG. 1 is a perspective view showing the essential constitution of a liquid crystal display device 1 (device constituted of members surrounded by an outside frame) according to an embodiment 1 of the present invention. FIG. 2A and FIG. 2B are cross-sectional views taken along a line A-A' and a line B-B' in FIG. 1 respectively. Arrows described on a left upper side in FIG. 1 indicate an azimuth of image data to be displayed and an azimuth arranged parallel to a normal direction of a plane of a liquid crystal panel 2 and defining a front surface and a back surface of the liquid crystal display device 1. Azimuths depicted by "up", "down", "left" and "right" indicate azimuths within the same plane as a display screen of the liquid crystal panel 2 and indicate azimuths of image data. (Image data corresponding to the upper side is displayed in the direction indicated by "up". In displaying scenery consisting of the sky and sea, for example, the sky is displayed on the upper side in a usual case). Further, "front surface" and "back surface" indicate azimuths for defining the front surface and the back surface. The backlight 3 (device constituted of members surrounded by an inner frame) radiates light to the liquid crystal panel 2 frontward of the backlight 3.

The backlight of this embodiment is a backlight of a type which arranges a light source 7 on upper and lower ends thereof. That is, the backlight of this embodiment is a so-called edge-light-type backlight. Further, the liquid crystal display device of this embodiment is a large-screen liquid crystal display device for a liquid-crystal television receiver set having a diagonal size of approximately 26 to 50 inches. Since the liquid crystal display device is the large-screen liquid crystal display device, the light source is arranged at a position different from an edge-light-type backlight mainly used in a PC monitor which arranges a light source on left and right end portions thereof.

In general, the backlight of the liquid crystal display device for a television receiver set requires a large quantity of light and hence, a plurality of light sources are arranged directly below the whole surface of a diffusion sheet 6. With respect to the so-called direct-type cold cathode fluorescent lamp backlight, approximately 16 cold cathode fluorescent lamps (hereinafter referred to as CCFL) are arranged.

As in the case of this embodiment, when the light source is arranged on end portions of the backlight, the acquisition of quantity of light necessary for the backlight becomes one problem. In this embodiment, a length of a display screen in the lateral direction is set larger than a length of the display screen in the vertical direction. Accordingly, to acquire a large quantity of light by increasing a light emitting surface of the light source, the light sources 7 are arranged on upper and lower sides such that the light sources become parallel to the lateral direction. In this embodiment, a hot cathode fluorescent lamp (hereinafter referred to as HCFL) having a large fluorescent light emitting surface is used for forming the light source 7 thus acquiring a large quantity of light. The light sources are not limited to the HCFL and may be formed of a CCFL or an LED (Light Emitting Diode). From a viewpoint of acquiring a large quantity of light, it is desirable to use the HCFL having a diameter of a tube (hereinafter referred to as a tube diameter) of a fluorescent lamp larger than a tube diameter of the CCFL and capable of outputting a large quantity of light as the light source. The tube diameter of CCFL is $\phi3$ mm to 4 mm, for example, while the tube diameter of the HCFL is $\phi15$ mm or more, for example. Further, an electric current per one fluorescent lamp is approximately 5 mA, for example, with respect to the CCFL, while an electric current per one fluorescent lamp is approximately 200 mA, for example, with respect to the HCFL. Accordingly, the HCFL can provide a large quantity of light. However, the present invention is not limited to a type of backlight including the edge-light-type, a type of a device which uses a liquid crystal display device as a display device including the large-screen liquid-crystal television receiver set, the arrangement of the light source at upper and lower ends and a type of light source. Accordingly, the light source is not limited to the HCFL.

In an upper portion of FIG. 1, symbol Tcon indicates a timing controller for controlling a liquid crystal panel, and numeral 4 indicates a front-face cover for fixing the liquid crystal panel 2 and the backlight 3. In a lower portion of FIG. 1, the detail of the backlight 3 is shown. Numeral 5 indicates an optical film formed of a prism sheet and a diffusion sheet. A diffusion plate 6 is a plate provided for diffusing light (or a plate supporting the optical film 5) and is generally made of a resin. Numeral 8 indicates a reflection sheet for reflecting light formed of a thin plate made of a resin such as polyester as a material thereof and having a thickness of approximately 0.01 mm to 1 mm. More preferably, the thickness of the reflection sheet 8 is approximately 0.1 mm to 0.5 mm. Further, the reflection sheet 8 is a bendable or foldable member. The reflection sheet 8 used in this embodiment is a reflection sheet of a type which performs random reflection and exhibits a reflectance of approximately 100%. As a specific example, white films E60L, E60V, E6SL made by Toray Ltd. can be used. Here, the reflection sheet may be of a mirror reflection property. Although the reflection sheet of a type which performs the mirror reflection exhibits the reflectance of approximately 95% in many cases, the reflection sheet has a property of casting the reflection light to a remote place by the mirror reflection.

Numerals 9 and 10 indicate reflector-shape forming members provided for fixing the reflection sheet 8 to the backlight 3 and imparting a shape to the reflection sheet 8 by sandwiching left and right end portions of the reflection sheet 8 therebetween. Numerals 11 and 12 indicate light-source-portion reflector-shape forming members provided for fixing the reflection sheet 8 to the backlight 3 and imparting a shape to the reflection sheet 8 by sandwiching left and right end portions of the reflection sheets surrounding the light sources 7 therebetween. The member 11 also functions as a lamp socket when the light source 7 is formed of an HCFL. As shown in FIG. 2B, numeral 19 indicates a lamp socket portion. The reflector-shape forming members 9, 10 are formed of a thick resin or the like and have a sufficient structural strength compared to the reflection sheet 8. The structure constituted of the reflection sheet 8 and the reflector-shape forming members 9, 10 forms a backlight housing. A conventional backlight housing is formed of a box having an opening for allowing the radiation of light and made of metal (iron in many cases) or a hard resin having a large thickness. The present invention is characterized by using the reflection sheet 8 as a bottom surface of the housing of the backlight. Accordingly, the hard and thick plate made of a metal or a resin for forming a bottom surface of the conventional backlight housing becomes no more necessary and hence, the liquid crystal display device of the invention has an advantageous effect that the liquid crystal display device becomes light-weighted.

Metal covers 13, 14 are mounted for acquiring a proper structural strength of the backlight housing. An optical member fixing jig 15 is provided for fixing the optical film 5 and the diffusion plate 6 to the backlight 3 and, at the same time, for supporting the liquid crystal panel 2. Pin support jigs 17 are provided for supporting the diffusion plate 6 and, at the same time, for fixing the reflection sheet 8. Mounting bars 16 are provided for fixing the left and right reflector-shape forming members 9, 10 and, at the same time, for mounting the pin support jigs 17, drive circuits and the like. Numeral 20 indicates threaded holes.

Numeral 18 indicates a light source drive circuit for driving the light sources 7. Since the light source is formed of the HCFL in this embodiment, the light source drive circuit 18 is formed of an inverter circuit. In general, with respect to a monitor of a personal computer or the like, light radiated from the edge portion is made incident on a light guide plate made of acryl or the like and is guided to a center portion from the edge portion and hence, the illuminance becomes substantially uniform over the whole surface of the backlight.

Figure 5A:
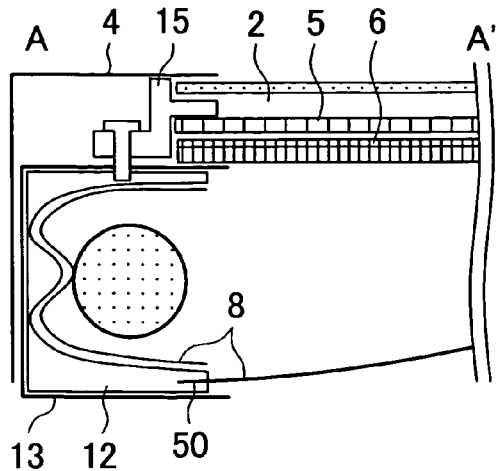
FIG. 5A to FIG. 5E are views showing examples of a portion to which the reflector is fixed at an upper end of the backlight.
Figure 5B:
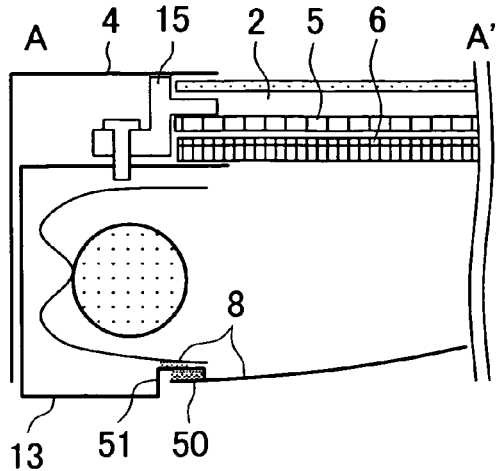
Figures 1, 5C:
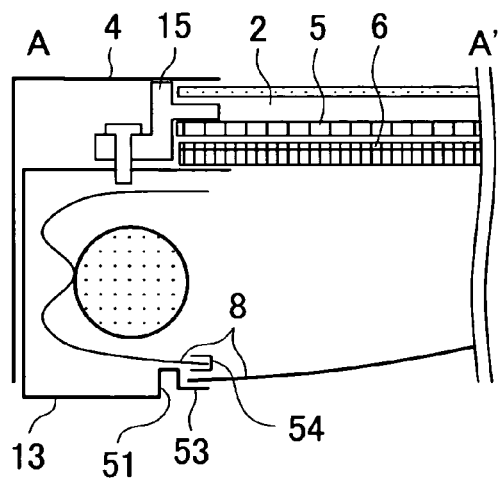
Figures 2, 5C:
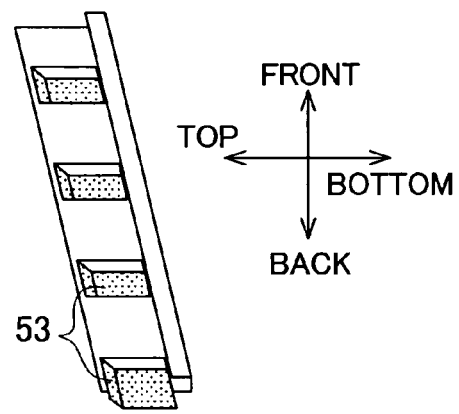

The backlight 3 of this embodiment is configured such that, as indicated by symbol RAY in FIG. 2, light radiated from the edge portion without using a light guide plate is reflected on the reflection sheet 8 to change the advancing direction of light and radiated to a center portion of the backlight 3 thus acquiring a uniform illuminance state. Here, it is important that the reflection sheet 8 can be formed into an arbitrary shape in conformity with the optical system.

The reflector-shape forming members 9, 10 are formed using a resin such as acryl, PC or ABS as a material, and can be manufactured by injection molding or the like. Accordingly, shapes of portions of the reflector-shape forming members 9, 10 which sandwich the reflection sheet 8 can be formed into arbitrary curved shapes by merely designing molds for forming the reflector-shape forming members 9, 10. As a result, it is possible to fix the reflection sheet 8 functioning as the reflector having an arbitrary curved shape to the backlight 3.

Figure 3A:
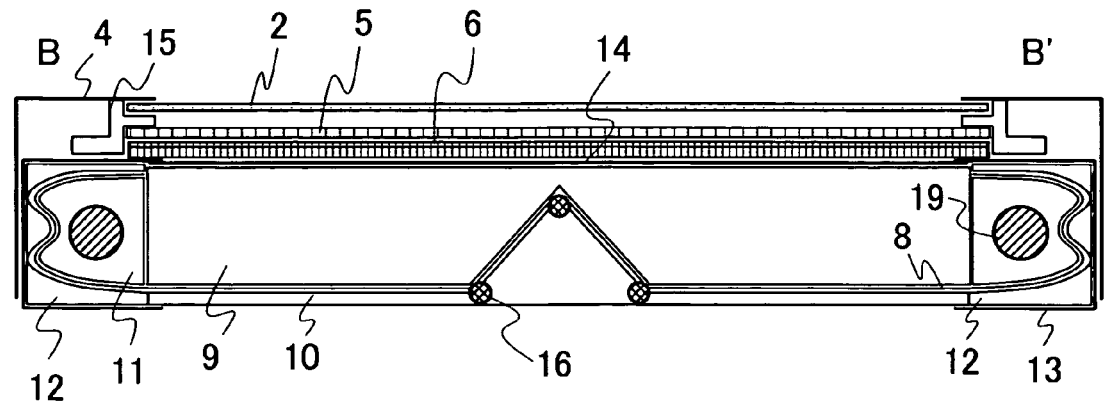
FIG. 3A to FIG. 3C are views showing examples of a reflector in the embodiment 1.
Figure 3B:
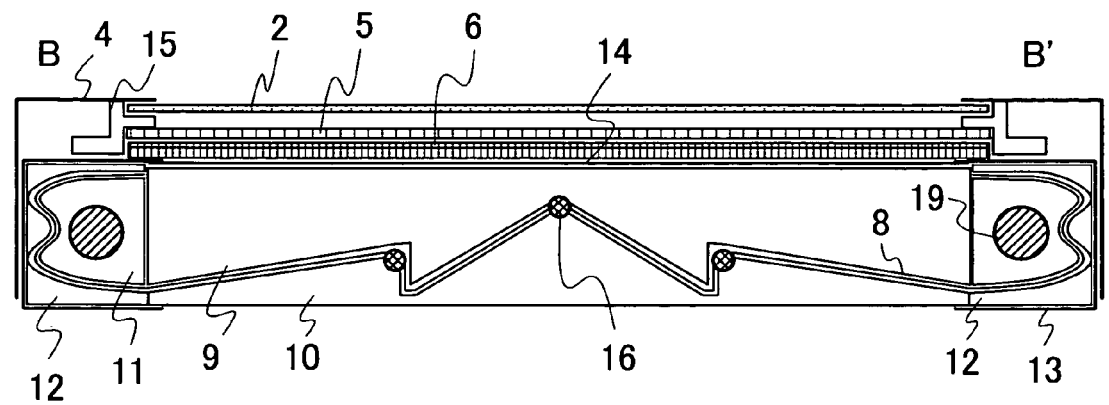
Figure 3C:
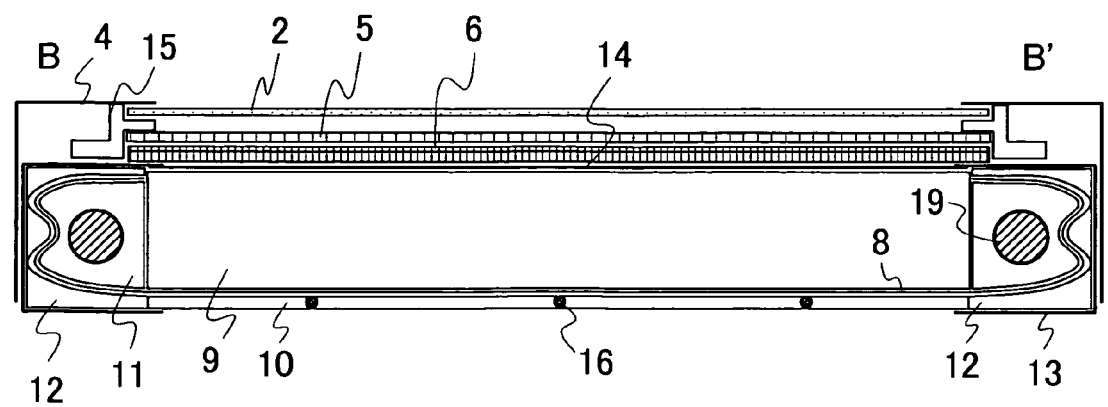

A shape of the reflection sheet 8 is not particularly limited to the curved shape. For example, as shown in FIG. 3A to FIG. 3C, the reflection sheet 8 may be formed into a triangular shape (FIG. 3A), a zigzag shape or a folded shape (FIG. 3B) or a planar shape (FIG. 3C). When the reflection sheet 8 is formed into a planar shape, the reflection sheet 8 can be used as a flat bottom surface of a backlight housing thus realizing the appearance structure not different from the appearance structure of the conventional backlight while acquiring the reduction of weight.

However, from a viewpoint of the structural strength of the reflection sheet 8 which constitutes the reflector, it is desirable to form the reflection sheet 8 into a curved shape or a bent shape. The superiority of such curved or bent shape is explained in detail in conjunction with FIG. 4A to FIG. 4C.

Figure 4A:
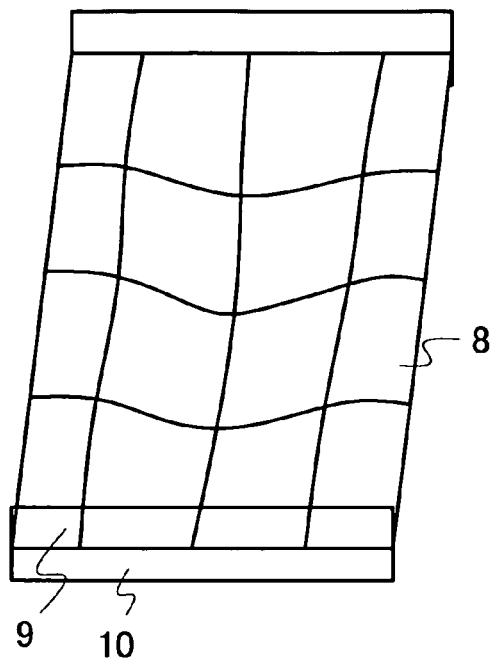
FIG. 4A to FIG. 4C are views showing examples of a curved surface of the reflector in the embodiment 1.
Figure 4C:
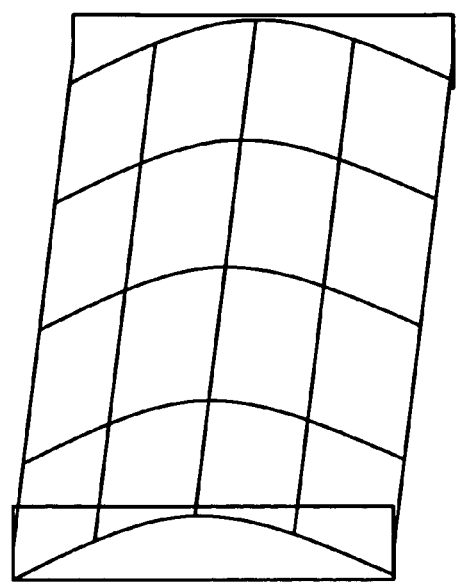
Figure 4B:
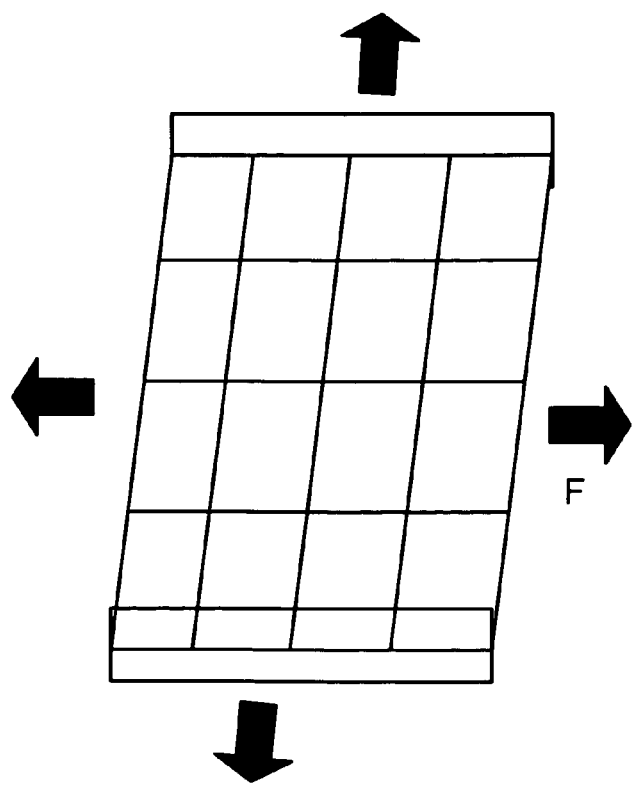

FIG. 4A shows a case in which the reflection sheet 8 having a planar shape is sandwiched by the reflector-shape forming members 9, 10. The drawing focuses on the structural strength and parts are described in a simplified manner. Further, for facilitating the understanding of the stereoscopic structure, the reflection sheet 8 is shown in as a wire-frame view. When the reflection sheet 8 has a planar shape, a portion of the reflection sheet 8 in the vicinity of the center of the reflection sheet 8 is deflected. To suppress this deflection, as shown in FIG. 4B, it is necessary to pull end surfaces of the reflection sheet 8 from four sides with a strong force F. On the other hand, as shown in FIG. 4C, when the reflection sheet 8 having an upwardly curved shape is sandwiched by the reflector-shape forming members 9, 10, no strong force F is necessary. The difference in structural strength between the planar reflection sheet 8 and the curved reflection sheet 8 can be simply reproduced using a piece of thick drawing paper. An advantageous effect brought about by the projecting curved shape can be acquired not only by the upwardly curved shape but also by a shape having an inflection point or a shape having a bending. A shape having a curve in any form can increase the structural strength compared to the planar shape.

As a method for fixing the reflection sheet 8, the explanation is made hereinafter with respect to a method which fixes the reflection sheet 8 by the reflector-shape forming members 9, 10 at four end portions including upper and lower end portions besides the left and right end portions. By fixing the four end portions of the reflection sheet 8, it is possible to provide the more rigid structure to the backlight 3. The method is explained in conjunction with FIG. 5A to FIG. 5E.

FIG. 5A to FIG. 5E are cross-sectional views corresponding to a line A-A' in FIG. 1 focusing on a portion which fixes the upper end portion of the reflection sheet 8, and show various examples. FIG. 5A shows the constitution in which a cutout 50 is formed in a back-side end portion of a light-source reflector-shape forming member 12 and the reflection sheet 8 is sandwiched at the cutout 50.

FIG. 5B shows a case in which the light-source reflector-shape forming member 12 is present only left and right end portions of the reflection sheet 8 in the same manner as the light-source reflector-shape forming member 11. A portion of a metal cover 13 is bent as indicated by numeral 51, and an adhesive agent 52 is provided in the portion 51. The reflection sheet can be fixed by adhering the reflection sheet 8 and the metal cover 13 to each other.

FIG. 5C-1 shows the constitution in which the metal cover 13 is bent at portions thereof indicated by numerals 51, 53, 54 and the reflection sheet 8 is fixed without using an adhesive agent. The stereoscopic structure constituted of portions 51, 53, 54 is as shown in FIG. 5C-2.

Figure 5D:
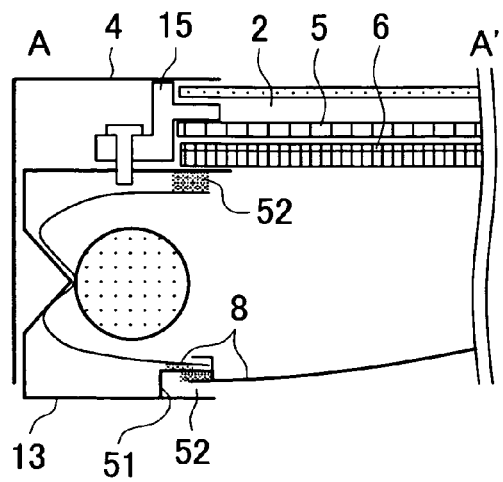
Figure 5E:
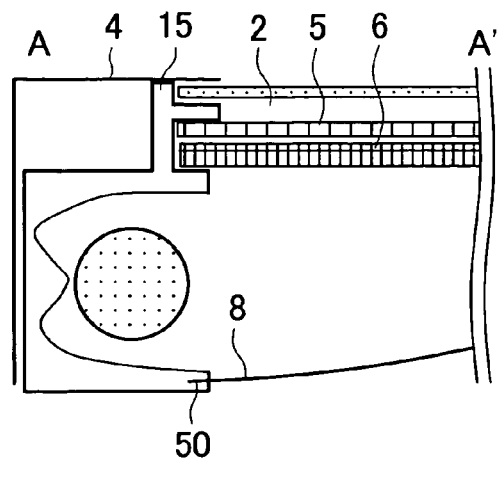

FIG. 5D shows the constitution which is configured to fix the reflection sheet 8 surrounding a light source by modifying the metal cover 13. FIG. 5E shows a case in which the reflection sheet 8 surrounding a light source and the metal cover 13 are eliminated and an optical member fixing jig 15 performs such functions. A cutout 50 is formed in a back-surface-side end portion of the optical member fixing jig 15 so as to sandwich the reflection sheet 8.

Figure 6A:
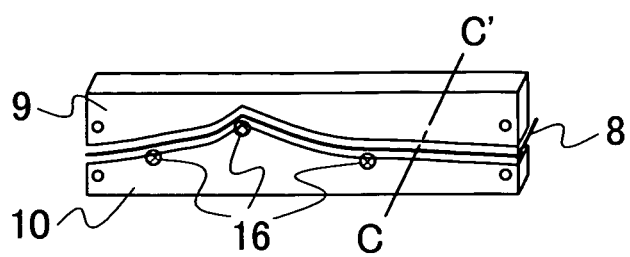
FIG. 6A to FIG. 6E are views showing an example for fixing the reflector on a side portion of the backlight.
Figure 6B:
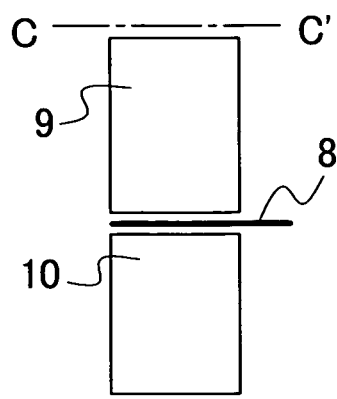
Figures 1, 6C:
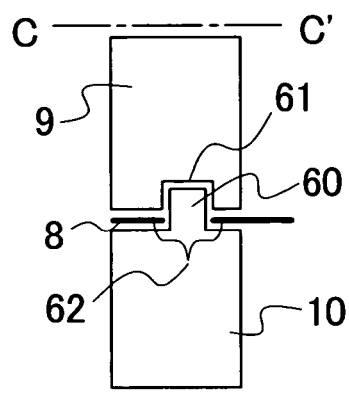
Figures 2, 6C:
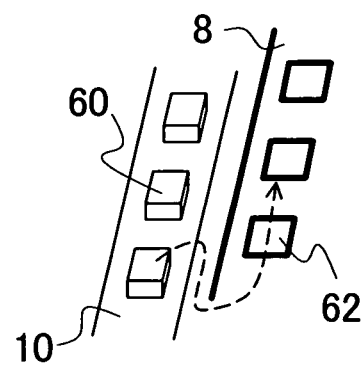

A method for fixing the reflector-shape forming members 9, 10 at left and right end portions is explained in detail in conjunction with FIG. 6A to FIG. 6E. FIG. 6A to FIG. 6E are views formed by focusing on the reflector-shape forming members 9, 10 and the reflection sheet 8 at the left end portion. FIG. 6A is a perspective view showing the schematic constitution of the fixing structure. FIG. 6B to FIG. 6E are cross-sectional views taken along a line C-C' in FIG. 6A and complementary explanatory views showing various constitutions of the fixing structure. FIG. 6B shows an example which sandwiches the reflection sheet 8 with two blocks in the same manner as the example shown in FIG. 1. FIG. 6C-1 shows an example in which a projecting portion 60 is formed in the reflector-shape forming member 10, a recessed portion 61 corresponding to the projecting portion 60 is formed in the reflector-shape forming member 9, a hole 62 corresponding to the projecting portion is formed in a left end portion of the reflection sheet 8, and the projecting portion 60 is fitted into the reflector-shape forming member 9 through the hole 62 formed in the reflection sheet 8 so as to fix the reflection sheet 8. FIG. 6C-2 shows the stereoscopic structure of the members.

To take the assembling of the backlight into consideration, in arranging the reflector-shape forming member 10, arranging the reflection sheet 8 on the reflector-shape forming member 10, and fitting the reflector-shape forming member 9 on the reflection sheet 8, the projecting portion 60 is preferably formed on the reflector-shape forming member 10. However, depending on the assembling method, the projecting portion 60 is preferably formed on the reflector-shape forming member 9.

Figure 6D:
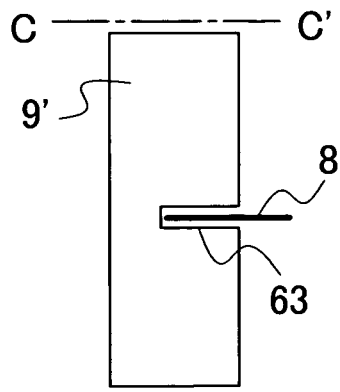
Figure 6E:
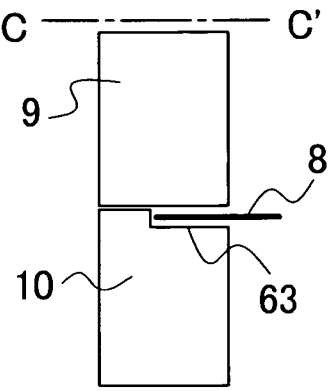

FIG. 6D shows an example in which, different from a type shown in FIG. 6A in which the reflection sheet 8 is fixed by being sandwiched by the separate reflector-shape forming members as indicated by numerals 9,10 shown in FIG. 6A, fixes the reflection sheet 8 by inserting the reflection sheet 8 into a cutout 63 formed in a reflector-shape forming member 9'. FIG. 6E shows an example in which a reflector-shape forming member is of a type which fixes the reflection sheet 8 by inserting the reflection sheet 8 into a cutout 63 in the same manner as the example shown in FIG. 6D and reflector-shape forming members are separated as shown in FIG. 6A.

The conventional edge-light backlight uses a light guide plate for guiding light emitted from a light source in the direction toward a liquid crystal panel. According to the present invention, with the use of the reflector or the reflection sheet described above, the light guide plate can be omitted. Accordingly, the present invention is largely advantageous for the reduction of weight and the reduction of cost of the backlight or the liquid crystal display device.

Embodiment 2

Figure 8A:
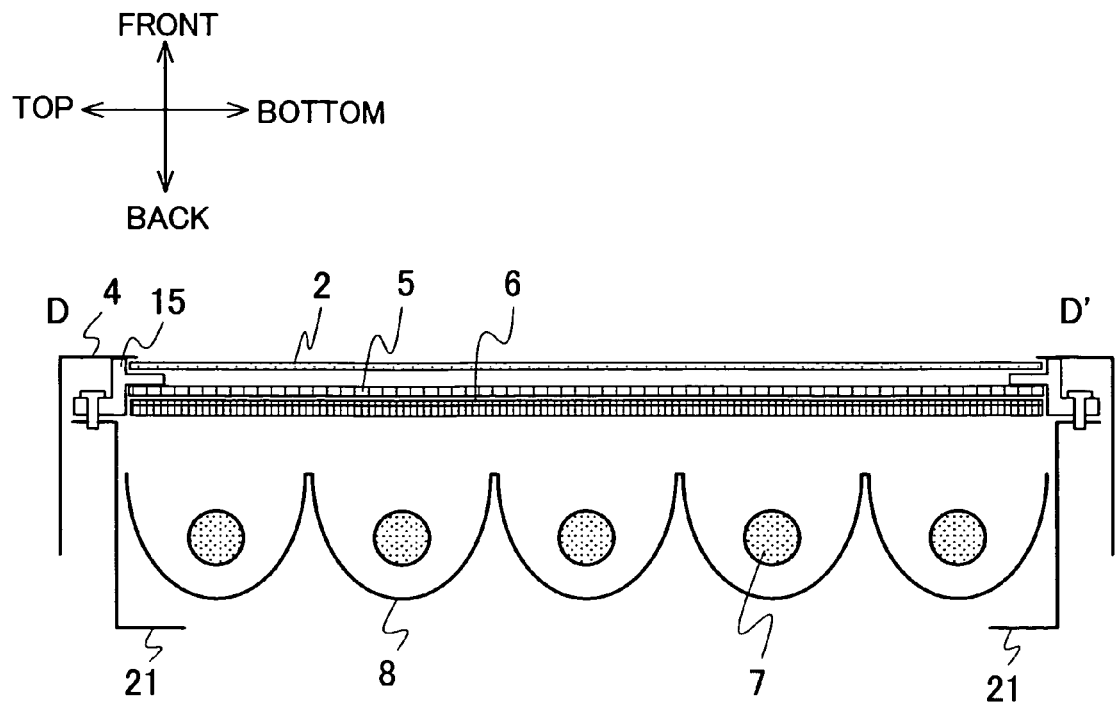
FIG. 8A and FIG. 8B are cross-sectional views taken along a line D-D' and a line E-E' in FIG. 7.
Figure 8B:
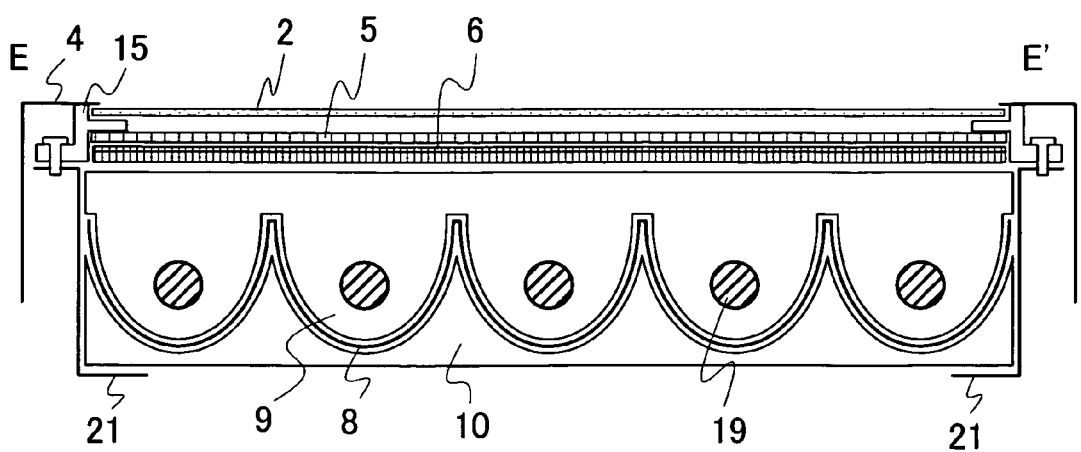

In the embodiment 1, the explanation has been made with respect to the example in which the present invention is applied to the edge-light-type backlight. In the embodiment 2, the explanation is made with respect to a case in which the present invention is applied to the direct-type backlight. FIG. 7 is a perspective view showing the main constitution of a liquid crystal display device 1 according to this embodiment (device constituted of members surrounded by an outer frame). FIG. 8A and FIG. 8B are cross-sectional views taken along a line D-D' in FIG. 7 and a line E-E' in FIG. 7. In this embodiment, a light source is formed of an HCFL. It is needless to say that the light source is not limited to the HCFL.

In a direct-type backlight, when a thickness of the backlight is small (when a distance between the light source and the diffusion plate is small) or when the number of light sources is small, there arises brightness irregularities that a space right above the light source is bright and a space between the light sources is dark. By forming the reflector in various shapes including a wave shape and a triangular shape, the brightness irregularities can be suppressed. In a conventional liquid crystal display device for a personal computer monitor, a triangular reflector is added to the backlight or a reflector wholly formed of a resin by molding is mounted on a whole surface of the backlight. However, in the case of a large-sized liquid crystal display device for a television receiver set, the addition of a material itself is not small, which increases the entire weight remarkably compared to a case that the material is added to a middle-sized or small-sized liquid crystal display device for a PC monitor use. Further, the addition of the material increases an industrial waste and gives rise to a drawback also from a viewpoint of the environmental destruction.

Accordingly, the present invention provides reflectors of various shapes by changing the conventional method for fixing a reflection sheet in a large-sized liquid crystal display device so as to suppress brightness irregularities and provide a light-weighted liquid crystal display device. The embodiment 2 uses the fixing method explained in conjunction with the embodiment 1. Numerals 9 and 10 indicate reflector-shape forming members which sandwich left and right end portions of the reflection sheet 8 to fix to the backlight and impart a shape to the reflection sheet 8.

The reflector-shape forming members 9, 10 are formed using a resin such as acryl, PC, ABS as a material and are manufactured by injection molding or the like. Accordingly, shapes of portions of the reflector-shape forming members 9, 10 which sandwich the reflection sheet 8 can be formed into arbitrary curved shapes by merely designing molds for forming the reflector-shape forming members 9, 10. As a result, it is possible to fix the reflection sheet 8 functioning as the reflector having an arbitrary curved shape to the backlight.

In FIG. 7 and FIG. 8, numeral 21 indicates a frame made of iron and the frame 21 forms a housing. Conventionally, a bottom surface of the backlight is also covered with iron. In the conventional backlight, the bottom surface is necessary for fixing a fluorescent lamp (particularly CCFL) thereto and, at the same time, for fixing a reflection sheet thereto. In this embodiment, the reflection sheet 8 is fixed by the reflector-shape forming members 9, 10 at the left and right end portions, an HCFL having a high structural strength and being tough compared to the CCFL is used as the light source 7, and the HCFL is also fixed to the reflector-shape forming member 9 and hence, the undesired bottom surface can be eliminated. Accordingly, a metal plate forming the bottom surface of the conventional backlight housing can be eliminated and hence, this embodiment 2 has an advantage to be light in weight.

As explained in conjunction with the embodiment 1, by fixing not only the left and right end portions of the reflection sheet 8 but also the upper and lower end portions of the reflection sheet 8 using an adhesive agent or the like, the structural strength of the reflection sheet 8 can be further increased. Further, as explained in conjunction with the embodiment 1, the reflection sheet 8 having a curved shape can exhibits a large stereoscopic structural strength compared to the reflection sheet 8 having a planar shape. Further, with respect to the detail of the method for fixing the reflector-shape forming members at left and right end portions of the reflection sheet 8, the contents of the embodiment 1 explained in conjunction with FIG. 6 is applicable to this embodiment 2.

Embodiment 3

This embodiment shows a case in which the present invention is applied to an edge-light-type backlight and mainly focuses on the back surface structure.

Figure 9A:
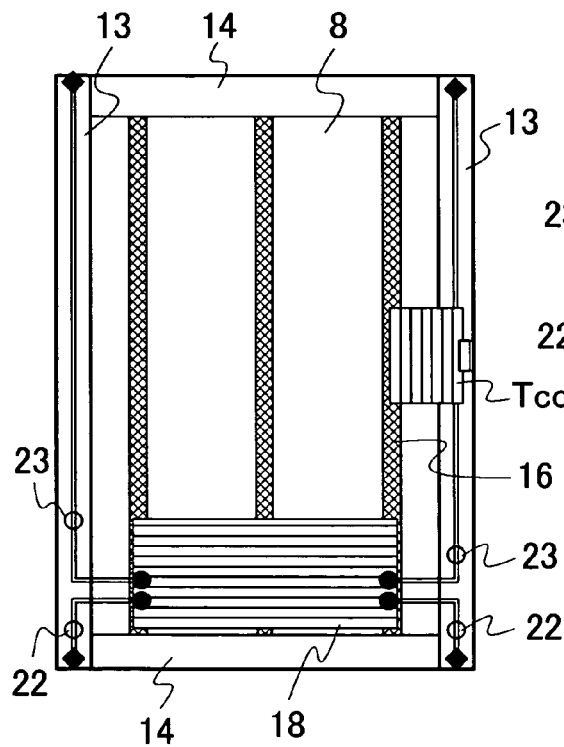
FIG. 9A to FIG. 9C are bottom plan views of a liquid crystal display device of an embodiment 3.
Figure 9B:
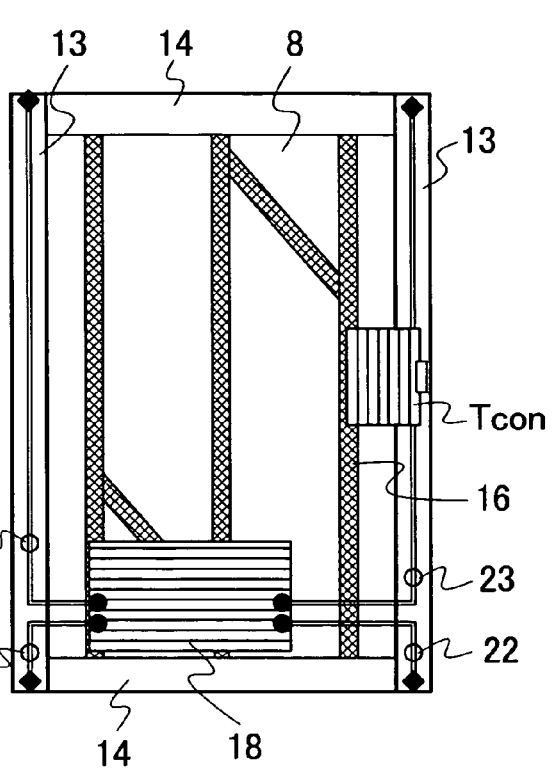
Figure 9C:
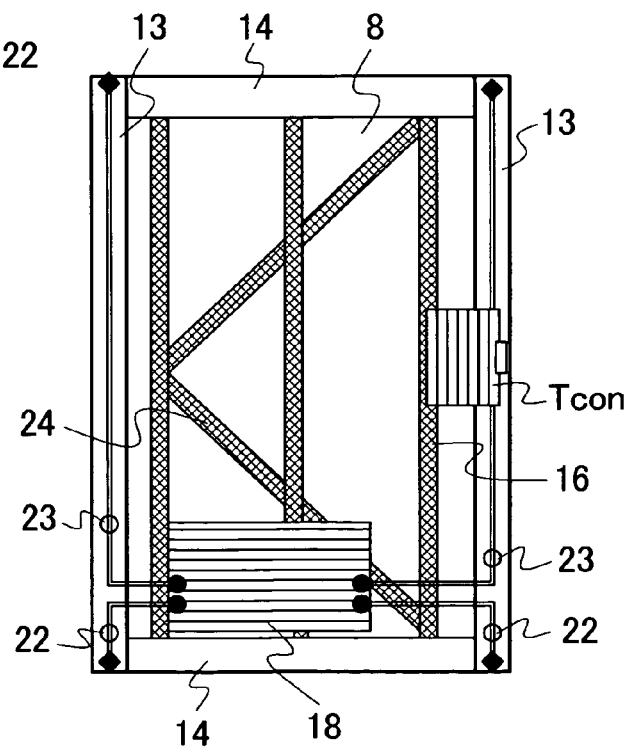

FIG. 9A to FIG. 9C are views showing the structure of a backlight as viewed from a back surface of the backlight. FIG. 9A shows the structure of the backlight shown in FIG. 1 as viewed from a back surface of the backlight, wherein the detail of lines extending toward lamps from a Tcon and a light source drive circuit 18 is added. The Tcon is fixed to a metal cover 13 and a mounting bar 16. Out of lines extending toward the light source 7 from the light source drive circuit 18, for setting a high-voltage-side line 22 shorter than a low-voltage-side line 23, the light source drive circuit 18 is arranged on an end portion (left end in the drawing) of the backlight.

FIG. 9B shows an example which increases the structural strength by inserting a beam 24 between the mounting bar 16 and the reflector-shape forming member 9 or 10 (not shown in the drawing). FIG. 9C shows an example which increases the structural strength by inserting a beam 24 between mounting bars 16 arranged at both ends. Compared to a case which one beam is obliquely insented between the mounting bars 16, inserting an "L-shaped" beam between the mounting bars 16 can increase the structural strength between the mounting bars 16 thus increasing the vibration resistance of the bars 16 at both ends against the vibrations in the vertical direction and the lateral direction.

The constitution of the back surface of the backlight explained in this embodiment is applicable not only to the edge-light-type backlight but also to the direct-type backlight.

Embodiment 4

In this embodiment 4, an example of an assembling method when the present invention is applied to the edge-light-type backlight is explained in conjunction with FIG. 10.

FIG. 10 is an explanatory view for explaining assembling of the backlight constitution shown in FIG. 1. Only main members are shown in FIG. 10.

In the assembly of the back light, a lamp unit assembly for assembling a lamp unit 26 constituted of the reflection sheet 8, the light source 7 and the light source reflector-shape forming members 11, 12, and a main chassis assembly for assembling a main housing 28 mainly constituted of the reflection sheet 8 and the reflector-shape forming members 9,10 are performed in parallel and, finally, the lamp unit 26 and the main housing 28 are assembled in a final assembly.

The lamp unit assembly is explained. The light-source reflector-shape forming member 12 is fitted into the metal cover 13 in a first step L-a. In a next step L-b, the reflection sheet 8, the light source 7 and the light-source reflector-shape forming member 11 are fitted into the block 25 where the light-source reflector-shape forming member 12 is fitted into the metal cover 13, thus completing the lamp unit 26.

The main chassis assembly is explained. In a first step M-a, the mounting bars 16 which is arranged much backward than the reflection sheet 8 is mounted on the reflector-shape forming member 10 and, thereafter, the reflection sheet 8 is mounted. The reflection sheet 8 is fixed by the pin support jigs 17 thus forming the block 27. In a next step M-b, the reflector-shape forming member 9 is mounted on the block 27 thus completing the main housing 28.

The final assembly is explained. In a first step F-a, a mounting block 29 is formed by mounting a metal cover 14 on the main housing 28. In a next step F-b, most portion of the backlight is formed by joining the block 29 and the lamp unit 26 together. Thereafter, the diffusion plate 6, the optical film, the optical member fixing jig 15, the light source drive circuit 18 (not shown in the drawing) and the like are mounted thus completing the backlight.

This embodiment is characterized by dividing the backlight assembly step described in this embodiment of the present invention into two systems and performing these systems in parallel thus enhancing the backlight assembling efficiency. It is needless to say that the mounting order of the respective members may be reversed depending on the shapes or the like of the reflector-shape forming member or the metal cover. However, fundamentally, by dividing the backlight assembly into the edge portion (block 25 or the portion indicated by 26) assembly and the main housing portion assembly and assembling these portions, the assembling efficiency can be enhanced.

Embodiment 5

In this embodiment, the explanation is made with respect to a case in which portions of the reflector-shape forming member and the light source reflector-shape forming member in the edge-light-type backlight are integrally formed in conjunction with FIG. 11A to FIG. 11D.

Figure 11A:
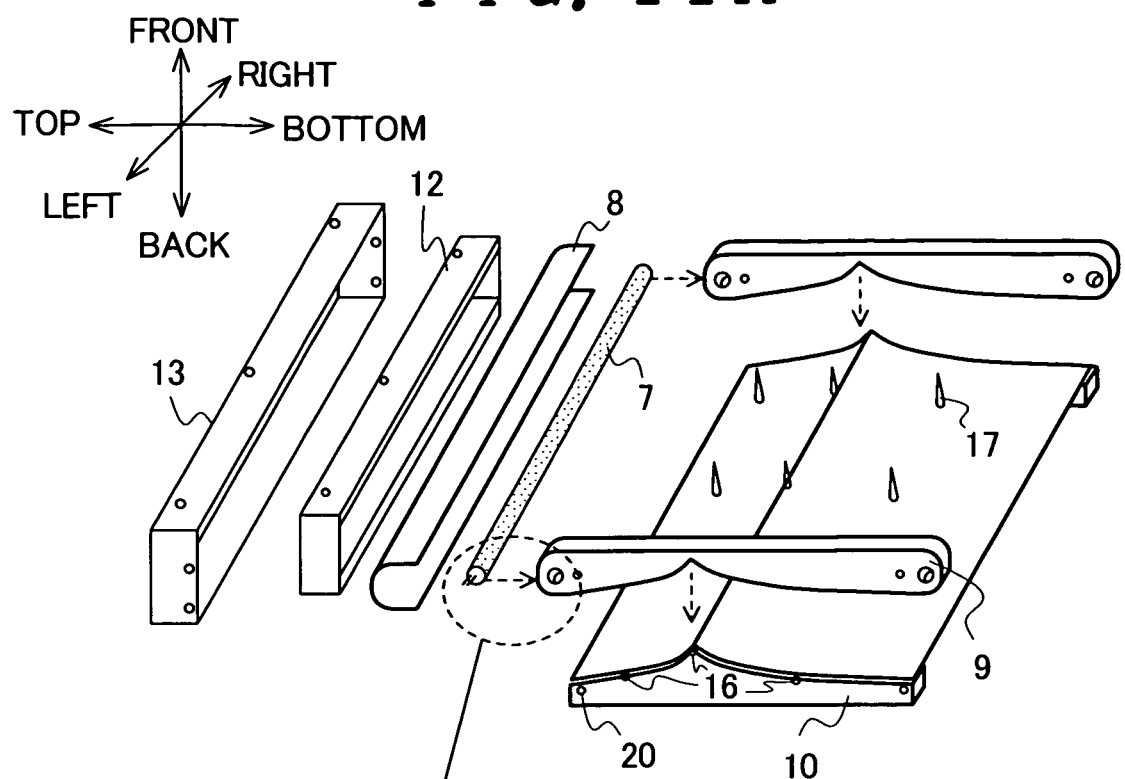
FIG. 11A to FIG. 11D are exploded perspective views of a liquid crystal display device according to an embodiment 5.
Figure 11B:
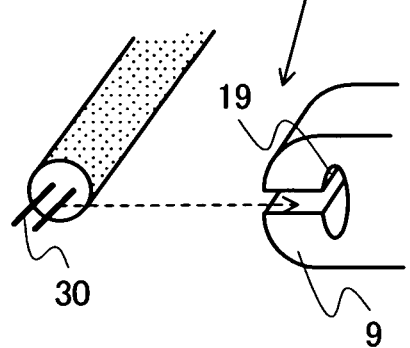
Figure 11C:
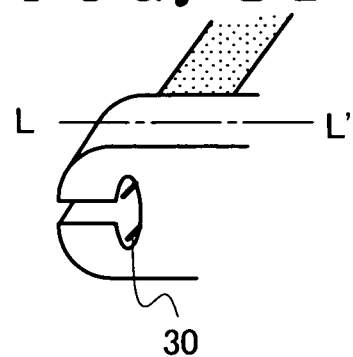
Figure 11D:
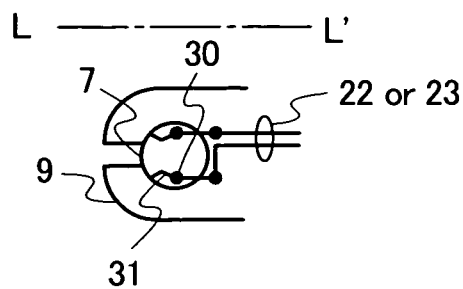

FIG. 11A is a perspective view showing the case in which the reflector-shape forming member 9 also plays a role of the light-source reflector-shape forming member 11 in FIG. 1 and an HCFL is used as a light source. FIG. 11B shows the detail of a portion surrounded by a dotted line in FIG. 11A. FIG. 11C shows the edge-light-type backlight when the HCFL is mounted on a lamp socket portion. FIG. 11D is a cross-sectional view taken along a line L-L' in FIG. 11C.

In this embodiment, the HCFL is mounted on the lamp socket portion 19 from upper and lower end portions of the reflector-shape forming member 9. Numeral 30 indicates a lamp electrode pin of the HCFL, and the lamp electrode pin 30 is inserted into the lamp socket portion 19 by sliding the lamp electrode pin 30 through air gaps formed in upper and lower end portions of the reflector-shape forming member 9. The air gaps may be formed on a front-surface side in the vicinity of the upper and lower end portions. By forming the air gaps in the front-surface side, it is possible to slide the lamp into the lamp socket portion from the front surface side and hence, the assembling of the lamp is facilitated whereby the assembling efficiency is enhanced. By inserting the lamp electrode pin 30 into the lamp socket portion by sliding and rotating the HCFL by 90° about a lamp axis, the HCFL can be fixed to the lamp socket portion. Fixing is performed by an electrode fixing jig 31 which also functions as an electrode.

According to this embodiment, by integrally forming the portions of the reflector-shape forming member and the light source reflector-shape forming member, the number of parts can be reduced thus enhancing the assembling efficiency. It is needless to say that the enhancement of the assembling efficiency reduces an operation time in a plant and reduces power consumption in a plant leading to the reduction of environmental destruction.

Embodiment 6

Figure 12:
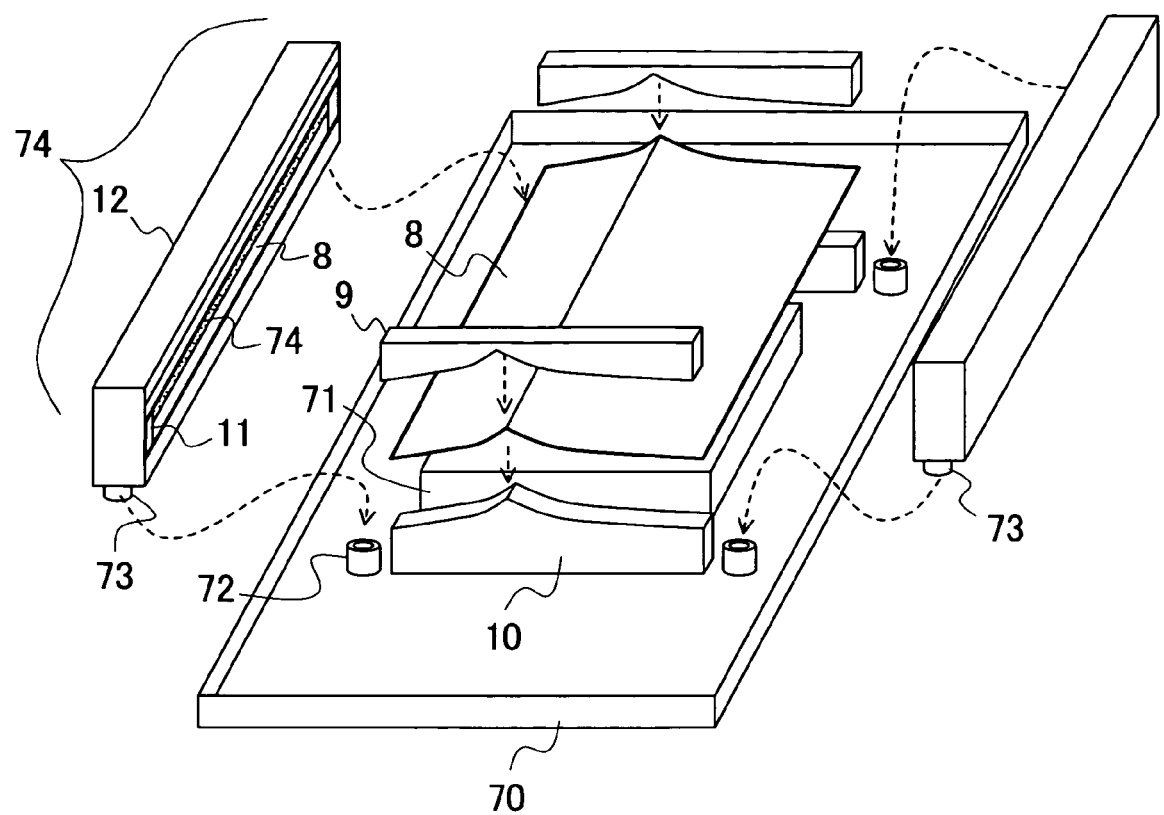
FIG. 12 is an exploded perspective view of a liquid crystal display device according to an embodiment 6.

In this embodiment, the explanation is made with respect to a case in which a portion of the reflector-shape forming member in the edge-light-type backlight and a back cabinet 70 of a liquid crystal television receiver set are integrally formed in conjunction with FIG. 12.

In this embodiment, the reflector-shape forming member 10 and the back cabinet 70 are integrally formed. Between a reflection sheet 8 and the back cabinet 70, a circuit group 71 constituted of a light source drive circuit, a power source circuit of the liquid crystal television receiver set, an image data conversion circuit producing a beautiful image is arranged.

A block 74 constituted of the light source 7, the reflection sheet 8 and the light source reflector-shape forming members 11, 12 is fixed to the back cabinet 70 by fitting a projecting portion 73 formed on the block 74 into a recessed portion formed in the back cabinet 70.

This arrangement is configured to reduce the number of parts by making use of a portion of the back cabinet 70 as the reflector-shape forming member thus enhancing the assembling efficiency.

Although the embodiment is explained by taking the edge-light-type backlight as the example, this embodiment is not limited to the edge-light-type backlight and is applicable to the direct-type backlight.

What is claimed is:
1. A liquid crystal display device, comprising:
a liquid crystal panel; and
a backlight arranged on a side opposite to a display screen of the liquid crystal panel, wherein the backlight includes a light source and a reflector for reflecting light radiated from the light source toward the liquid crystal panel, a circuit board which drives a light source of the backlight, and a reflector fixing portion which is arranged on a short side of a screen of the liquid crystal display device, a reflector fixing portion holding a short side end portion of the reflector, and the reflector forms a bottom surface of the backlight, wherein the circuit board is arranged in a central bent portion of the reflector.

2. A liquid crystal display device according to claim 1, wherein a pair of reflector-shape forming members for fixing the reflector are provided, and the reflector is sandwiched by the pair of reflector-shape forming members.

3. A liquid crystal display device according to claim 1, wherein a shape of the reflector is a curved shape.

4. A liquid crystal display device according to claim 1, wherein the backlight is an edge-light-type backlight.

5. A liquid crystal display device according to claim 4, wherein the light source of the backlight is a hot cathode fluorescent lamp.

6. A liquid crystal display device according to claim 1, wherein a plate thickness of the reflector is 0.01 mm to 1 mm.

7. A liquid crystal display device according to claim 4, wherein the backlight does not include a light guide plate.

8. A liquid crystal display device according to claim 1, wherein the backlight is an edge-light-type backlight having no light guide plate.

* * * * *